United States Patent [19]
Campbell et al.

[11] Patent Number: 5,295,918
[45] Date of Patent: Mar. 22, 1994

[54] DRIVE SYSTEM

[75] Inventors: Nigel S. Campbell; David Lavender, both of Nelson, England

[73] Assignee: Drive Systems Limited, Preston, England

[21] Appl. No.: 910,088

[22] Filed: Aug. 10, 1992

[30] Foreign Application Priority Data

Jan. 12, 1990 [GB] United Kingdom ............... 9000716

[51] Int. Cl.⁵ .................................................. F16H 7/08
[52] U.S. Cl. ..................................... 474/101; 474/111
[58] Field of Search ............... 474/101, 109, 111, 113, 474/114, 140; 68/12.24, 23.1, 23.6, 23.7; 192/116.5, 127

[56] References Cited

U.S. PATENT DOCUMENTS 5,052,547 10/1991 Doi ................................. 474/111 X
5,181,888 1/1993 Takahashi et al. ................ 474/101

Primary Examiner—Thuy M. Bui
Attorney, Agent, or Firm—Richard E. Jenkins

[57] ABSTRACT

A rotary arm sewage treatment bed has its rotary arms driven by an electrical drive system. The drive system comprises a driving ring (7) to which the arms are secured. The drive ring is driven by a friction belt (8), from a drive wheel (10). The drive wheel (10) is mounted on a pivoted carriage (18). A compressor (30) operates a piston/cylinder (36)/(34). In normal use, the piston (36) acts on the carriage (18) to cause tensioning of the belt (8), and thus enable drive. In the event of a supply failure, the piston is retracted by a return spring and the drive is disengaged, the carriage being pivoted such that the drive wheel is no longer in a position to tension the belt (8). The arms are then free to rotate under the reaction force of the sewage emitted, until the power supply is restored.

16 Claims, 3 Drawing Sheets

DRIVE SYSTEM

This invention relates to a drive system, in particular to a drive system suitable for driving a rotary arm arrangement of a sewage treatment bed. In one aspect the invention relates to a sewage feed and/or treatment system employing a drive system of the invention, and in another aspect the invention relates to a drive system per se, which could be used in other contexts.

A sewage bed typically comprises a circular bed containing rough stones, known as media, which provide a large surface area. Sewage is deposited onto the stones by a rotating arm or arms. A high level of selected bacterial material is present in the material on the stones to effect rapid breakdown of the sewage into nontoxic products.

The rotary arm arrangement typically comprises a pair of arms, or two pairs of arms, mounted for rotation an a hub at the centre of the bed. The arm or arms are in the form of pipes which are fed with sewage. To one side of the hub, the arm or arms comprises a plurality of spaced-apart outlet holes for sewage, facing in a common, generally horizontal direction, and to the other side of the hub, the arm or arms comprises a similar set of outlet holes, facing in a common, generally horizontal direction opposed to the holes to the other side of the hub. Typically, the arm arrangement is driven by the reaction force arising from the issue of sewage from the holes in the arms, with no additional means of power being provided.

Although the arrangement described above has the virtue of simplicity, there are substantial disadvantages associated with it. For example, following heavy rain, the arm arrangement rotates more rapidly because the sewage flow is increased. Following a dry spell, the arm arrangement rotates more slowly, or may even stop. It may be affected by wind. In this context it must be borne in that there is an optimum rate of deposition of sewage onto the sewage bed, but that, as will be clear from the foregoing, the arrangement described cannot consistently provide deposition of the sewage at that optimum rate. In particular, deposition can be very uneven at low rates of rotation of the arms, during dry weather. This means that, in regions of the bed of heavy deposition, the bacterial dilution may be high, at least initially, before bacterial reproduction can restore the position, and, more significantly, air circulation in those regions may be poor, so that aerobic bacteria cannot break down material efficiently.

In accordance with a first aspect of the present invention there is provided a drive system comprising a rotary part to be rotated, a drive wheel in driving engagement, in normal use, with the rotary part, an electric motor for driving the drive wheel, and a control means for automatically removing the drive wheel from driving engagement with the rotary part in any one or more of the following circumstances: if the supply voltage fails; if the supply voltage falls below a minimum voltage; if for a reason other than the voltage failing or falling below said minimum voltage, the motor does not operate.

Preferably said removal of the drive wheel occurs in at least two of the circumstances mentioned above, and preferably in each such circumstance.

In accordance with a second aspect of the present invention there is provided a rotary arm system for a sewage treatment bed, comprising a drive system as defined in relation to the first aspect of the present invention described above, wherein said rotary part comprises at least one rotary arm from which sewage may issue.

When the control means acts to remove the drive wheel from driving engagement with the rotary part the drive system is disengaged and the rotary part is free to operate in the already known manner described above, by the reaction effect. Thus, the drive system may provide controlled operation but, should there be a power cut, or a substantial voltage drop, sewage distribution will still take place. The motor is arranged to operate over a wide range, for example with a tolerance of at least about 30%, preferably about 55%, about the mean voltage as stated by the relevant electricity supply company.

Preferably the system is arranged such that, once power is restored or the voltage returns to a working voltage, the system automatically re-commences operation.

Preferably, the drive wheel is in driving engagement with the rotary part via a drive belt, the rotary part preferably comprising a drive ring. Preferably, the drive belt is of the frictional type, as opposed to the toothed type, so that the belt will simply slip, should the rotary part be obstructed.

Suitably the drive belt is taken off the rotary part and courses around a wheel whose position, inwardly to and outwardly from the rotary part, is controlled by the control means. This wheel may be the drive wheel mentioned previously. Alternatively it could be a further wheel. Preferably, however, it is the drive wheel. Suitably, the control means acts on the wheel (whether the drive wheel or further wheel) so as to control the tension of the belt when the motor is in operation, as well as to remove the drive wheel from driving engagement with the rotary part when the motor does not operate. Suitably the wheel is flanged.

Preferably the drive system comprises two spaced-apart take-off wheels closely adjacent to or contacting the rotary part, which convey the drive belt two spaced-apart take-off wheels closely adjacent to or contacting the rotary part, which convey the drive belt to a wheel as described in the previous paragraph. Preferably, the drive belt, as it passes between each take-off wheel and the other wheel is arranged substantially radially of the rotary part, the drive belt thus following a U-shape off the rotary part. Preferably, each take-off wheel is flanged. Preferably, the flanges thereof are arranged to run over the rotary part. Suitably, means are provided for adjusting the position of the take-off wheels. Means may be provided for adjusting them towards and away from each other, that is, substantially tangentially of the rotary part. This may be useful in order to adjust the tension of the drive belt. Means may be provided for adjusting them substantially perpendicularly to the above-mentioned sense, that is, substantially radially of the rotary part. Thus may be useful to locate the flanges on the rotary part. One or preferably both such means may be provided. Such means may take various forms. One example is described hereafter with respect to FIG. 3.

Preferably, the drive wheel is mounted on a movable carriage. Preferably, the carriage is pivotally mounted to a fixed part, the axis of the drive wheel and the pivot axis being substantially parallel to one another and spaced apart. Suitably, the pivot axis and the axis of the drive wheel are spaced from a hub of the rotary part by a similar distance. Preferably, the pivoted carriage carries the motor for the drive wheel and any gear unit that may be required.

Suitably the control means comprises a pressurised-fluid force-providing part, for example a piston and cylinder or pressurised bag, and a compressor to pressurise the fluid therein. The compressor may be operated by the motor, for example via a second take-off shaft. If this system is employed the control means will act to disengage the drive should the motor fail other than because of power supply problems. Alternatively the compressor may be operated independently of the motor. If this system is employed it may be desirable to employ means for sensing motor stoppage other than because of power supply problems, and for then releasing or reducing pressure in the pressurised-fluid force-providing part so that the drive wheel is released.

Preferably the pressurised fluid is air.

Preferably, the pressurised-fluid force-providing part acts on the carriage in a sense to urge the drive wheel generally away from the axis of the rotary part, and thereby tension the belt. Suitably, the carriage is thus urged so that the belt is tensioned to a predetermined extent, which is preferably selectable by an operator. To this end the pressurised-fluid force-providing part may comprise a pressure limiting valve, which is adjustable by an operator.

Preferably, a pivoted carriage as described in the previous paragraph is biassed by resilient means, in a sense to urge the drive wheel generally towards the axis of the rotary part, and thereby release the tension in the belt and disengage the drive. Thus, should the power supply fail altogether the motor will stop, the compressor will stop and the pressurised fluid force-providing part will no longer act to control the position of the carriage. Then, only the resilient means will act, and it will act to release the belt tension. Should the voltage drop by a large amount the motor may or may not stop, depending on its type, but at a predetermined point the compressor will either stop or will pressurise fluid insufficiently for the pressurised-fluid force-providing part to maintain the drive wheel in the driving position. That is to say, the resilient means will overcome the pressurised-fluid force-providing part. However, the pressure will not drop instantaneously, and this is desirable, given that some voltage drops may be transient.

Many arrangements and types of resilient means are possible. One convenient arrangement is to employ a return spring in the cylinder of the pneumatic piston and cylinder (when present). Another is to secure it between the carriage and a fixed point at a suitable location.

Preferably the control means comprises mechanical stop means to determine a limit position of the carriage. Suitably, two such stop means are provided, on respective sides of the carriage, to determine the two limit positions of the carriage.

Means may be provided for sensing the amount of sewage to be deposited and for automatically altering the rate of rotation of the arms.

The invention will now be further described, by way of example, with reference to the accompanying drawings in which.

Figure 1:
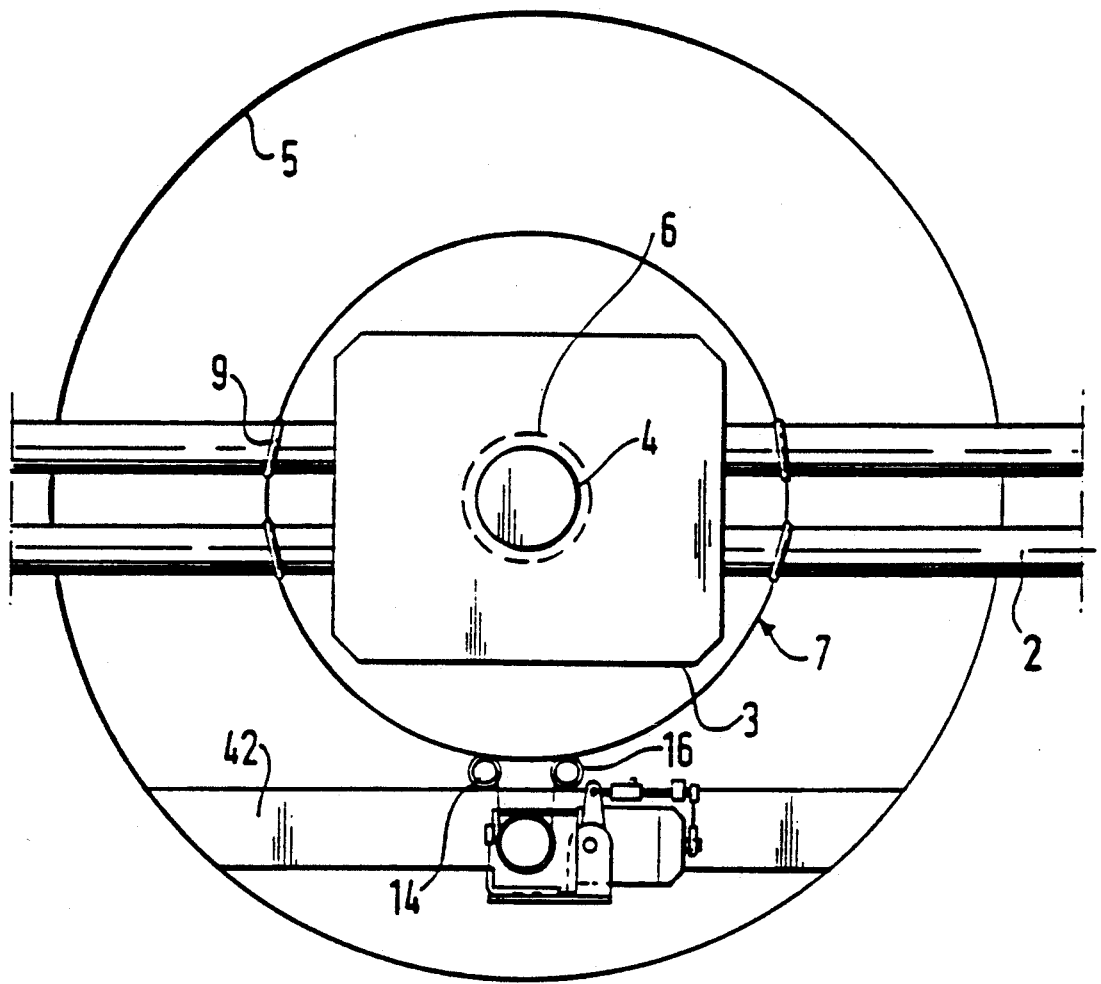
FIG. 1 is a schematic plan view of the central part of a circular sewage bed, showing a drive mechanism for the sewage feed arms thereof.

The sewage bed comprises a large outer area (not shown) laid with stones, known as media, on which sewage is broken down by bacterial action. The sewage is deposited on the stones by means of hollow distributor arms 2 having outlet holes spaced along their length. In this embodiment there are two arms 2 on each side of a tank 3. To one side of the tank, the arms have outlet holes which are generally horizontally directed, in a common direction, perpendicular to the arms and on the other side of the tank, the arms have outlet holes, which are generally horizontally directed, in a common direction, perpendicular to the arms, in the opposite direction.

The tank 3 is generally rectangular in horizontal cross-section. The tank is fed from above with sewage via an upright supply pipe 4 and communicates with the arms, which are bolted to the tank. The tank is located above a central well, the wall of which is shown as 5.

The arrangement is of the conventional type wherein the tank includes a central apertured upright cylindrical part 6 arranged around the pipe 4 which serves as a hub.

Level with the top of the well is a rigid drive ring 7 of circular horizontal cross section. The arms pass above the drive ring 7 and are secured thereto by means of respective metal stirrups 9 passed over the arms and bolted to the drive ring. The drive ring carries a drive belt 8 of the flat, frictional type. So that it can be driven, the drive belt 8 leaves the drive ring 4 over a short region, and, adopting a U-shaped course, passes over a drive wheel 10 driven by an electric motor and gearbox unit 12 (see FIG. 2). To this end a pair of flanged reaction wheels 14, 16, having their flanges engaged with the drive ring 7, convey the belt 8 to the drive wheel 10. The drive wheel is also flanged to prevent the belt from slipping off it.

The assembly of the electric motor and gearbox unit 12 and drive wheel 10 are mounted on a pivoted carriage 18. The pivot axis 20 of the carriage 18 is parallel to and spaced apart from the axis of the drive wheel 10. The spacing of the axis of the hub from the axis of the drive wheel and from the pivot axis 20 is about the same. It will be apparent that pivoting of the carriage about the pivot axis 20 will cause the drive wheel to move towards or away from the drive ring 7, and so cause the belt tension to decrease, perhaps to zero, or increase.

Figure 2:
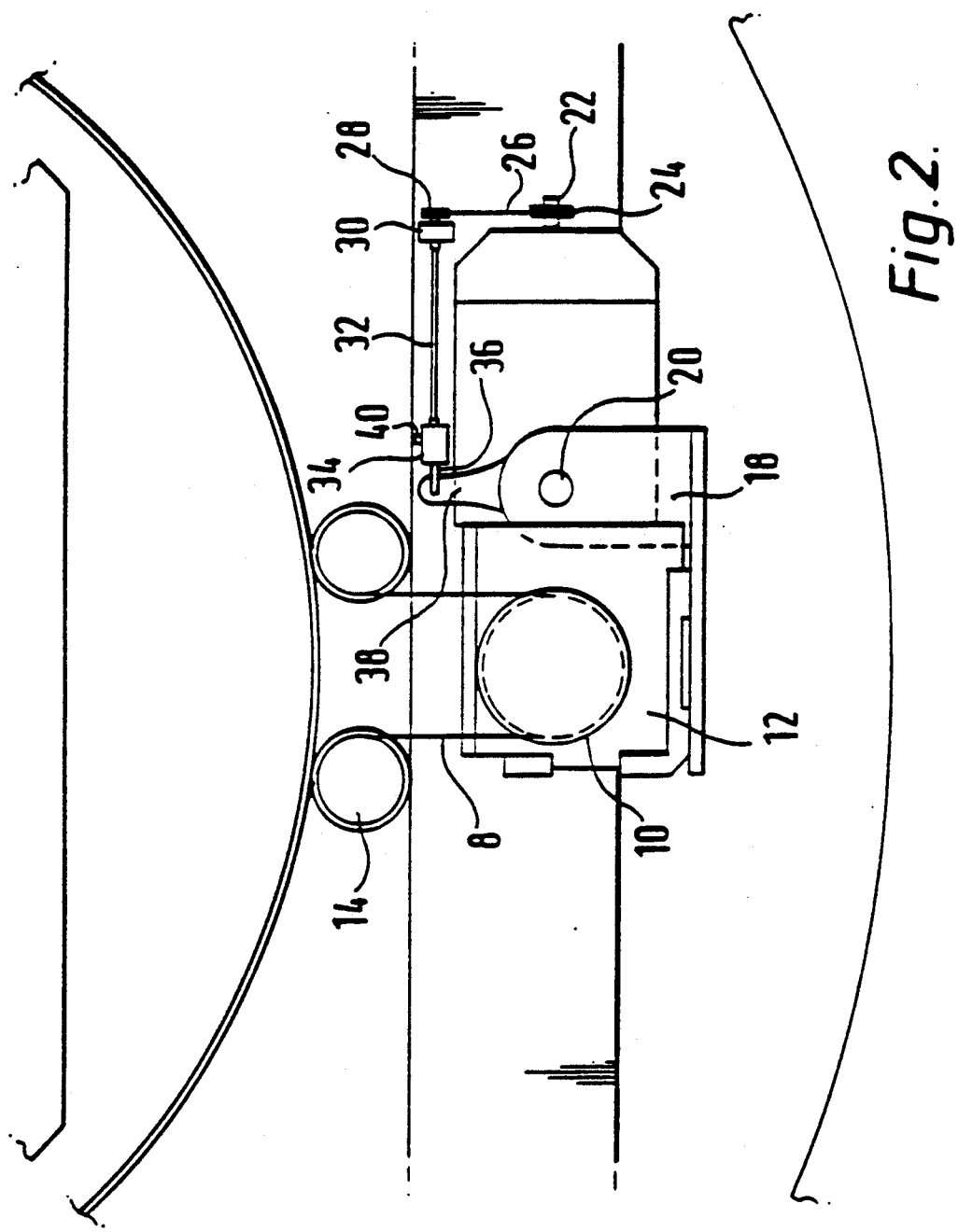
FIG. 2 is a more detailed plan view of the drive system of FIG. 1.

The motor has a second take-off shaft 22 which carries a toothed pulley 24. This is connected, via a toothed belt 26, with a toothed pulley 28. The pulley 28 is mounted on a shaft of a small air compressor 30. The body of the air compressor 30 is in a fixed position, being mounted to the carriage 18 by means not shown. The compressor is connected, by a flexible tube 32, to a small air cylinder 34. The air cylinder acts to control the position of a piston of which the piston arm 36 is shown. The piston arm is pivotally connected to a lever arm 38 of the pivoted carriage 18. A line drawn between the axis of the pivot between the lever arm 38 and the piston arm 36 and the pivot axis 20 of the carriage, is substantially perpendicular to a line drawn between the axis of the drive wheel 10 and the pivot axis 20. The arrangement is such that, when the piston arm 36 is advanced outwardly of the cylinder, it acts upon the lever in such a manner as to urge the pivoted carriage anti-clockwise, as shown in FIG. 2, and thereby urge the drive wheel 20 away from the drive ring 7 and thereby act to tension the belt 8.

Within the air cylinder 34, about the piston arm 36 and acting between the piston head and the end wall of the cylinder, is a helical spring. When the cylinder is pressurised, the piston is urged outwardly of the cylinder against the bias of the spring, which is compressed. Additionally, the air cylinder is provided with a pressure-limiting valve 40, the setting of which is easily adjustable by an operator.

The carriage 18, carrying the various parts described above, is secured via pivot point 20 to a beam member 42 whose ends are secured to the well wall, to one side of the well.

The operation of the drive system will now be described.

When the motor is operating, the drive wheel 10 is rotated, as is the second take-off shaft 22. By virtue of the rotation of the take-off shaft 22, the small air compressor 30 is operated, and the air in the cylinder 34 is pressurised, to an extent determined by the setting of the pressure limiting valve. The piston is urged outwardly and the lever arm 38, and therefor the pivoted carriage 18, is urged anti-clockwise, to an extent limited by the belt 8, which is thereby tensioned.

In the event that the motor fails for any reason, for example should there by a power cut, the second take-off shaft 22 is no longer driven and the compressor stops. The pressure within the cylinder 34 then drops, and the return spring operates to urge the piston shaft to the right, as shown in FIG. 2, thereby swinging the pivoted carriage 18 clockwise, moving the drive wheel 10 towards the drive ring 7, and thereby removing all tension from the belt. The arms 2 are then free to rotate under the reaction force of the sewage issuing from them.

Should the supply voltage fall to an unacceptable voltage, the motor may be arranged to cut out. Alternatively, it may continue to operate but the drive wheel is then disengaged because of poor air compression.

Should the arms 2 become obstructed in any way then the belt 8 will simply slip on the drive wheel 10.

Typically, the arms are driven slowly, at about three to fifteen revolutions per hour, and the electric motor is a four pole motor with a rating of about 370 watts. The gear box unit is typically of the planetary type.

Figure 3:
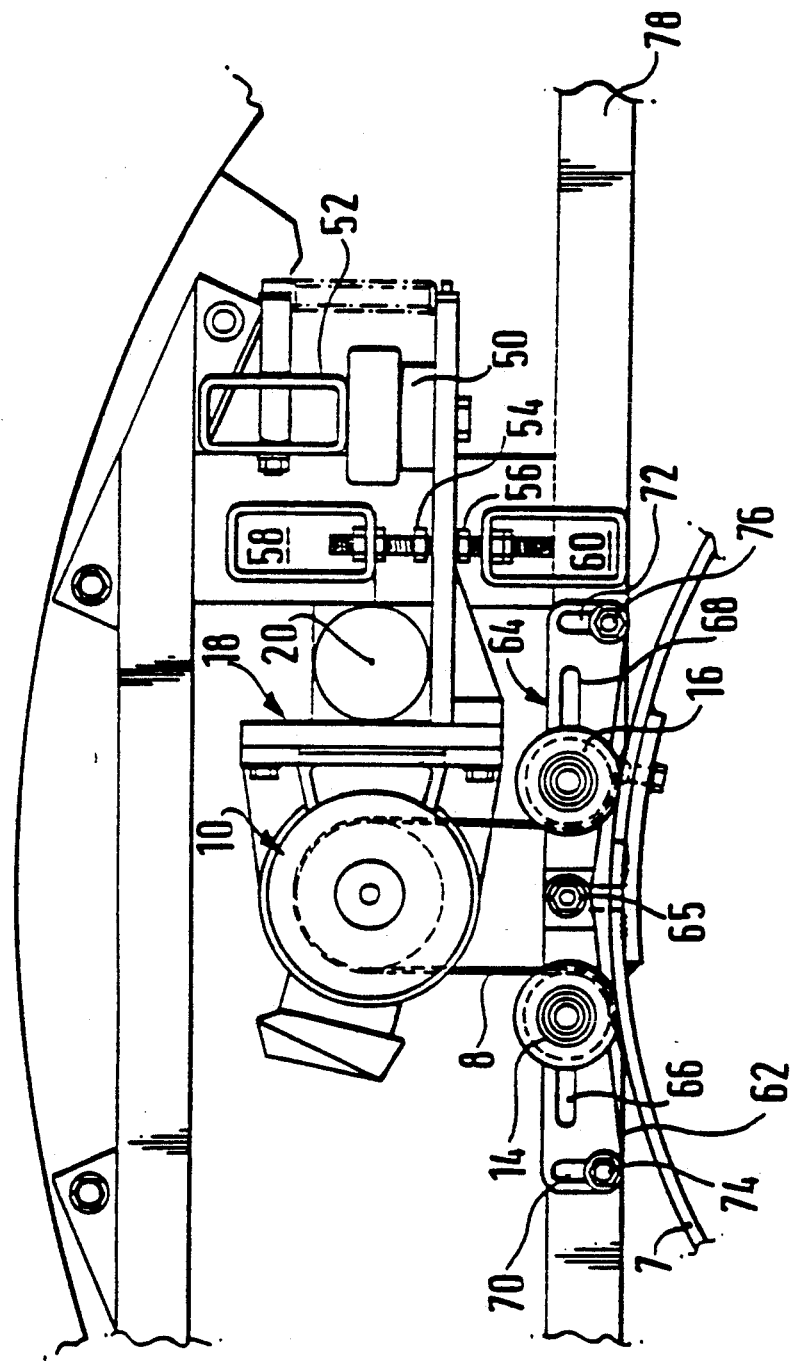
FIG. 3 is a plan view of a further drive system.

The embodiment shown in FIG. 3 is similar to that shown in FIGS. 1 and 2. Thus, there is a drive ring 7, a smooth frictional belt 8, a drive wheel 10 and a pair of flanged reaction wheels 14, 16. The drive wheel 10 is mounted on a carriage 18, pivoted about a pivot point 20. The main differences between the embodiments will now be described.

In the FIG. 3 embodiments an air bag 50 is employed, instead of a piston and cylinder, to act upon the carriage. The air bag acts between the carriage and a fixed post 52. The air bag is pressurised by a compressor which is independently operated, rather than being driven by the motor which rotates the drive wheel 10. Electrical current protection devices protect the motor from overload, but should the motor fail, for example for reasons other than power supply failure, the compressor operation is automatically terminated, so that the belt tension is released. Further, an alarm is sounded to indicate the motor failure.

In the FIG. 3 embodiment mechanical stop members 54, 56 are provided about opposed faces of part of the carriage, to determine the two extreme carriage positions. It will be seen that each stop member is adjustable, each essentially being a threaded bolt passing through an aperture in a respective frame member 58, 60, and being secured in desired positions by means of nuts.

In the FIG. 3 embodiment there is provision for adjustment of the take-off or reaction wheels 14, 16, approximately radially of the drive ring and approximately tangentially thereof—to be precise, towards and away from each other and perpendicularly to that sense. Thus, each reaction wheel 14, 16 is carried on a respective plate 62, 64, the two plates being centrally pivoted together at a pivot point 65. Each plate 62, 64 has a respective slot 66, 68 through which a stub axle of the respective reaction wheel 14, 16 passes and is fixed, in a desired position along the slot. The slots 66, 68 are aligned with each other and enable the reaction wheels to be moved towards and away from each other. Each plate 62, 64 has a respective further slot 70, 72 perpendicular to and not contacting the slots 66, 68, each located at the end of the respective plate 62, 64 remote from the pivot point 65. Respective bolts/nuts 74, 76 passing through the respective slots 66, 68 secure the respective plates 62, 64 to a frame member 78 at a desired orientation.

The provision for adjustment of the position of the reaction wheels in the two senses may be useful for various reasons. For example, it is desirable to adjust them so that their flanges contact and run on the drive ring. Further, they may be moved towards or apart from each other in order to alter the belt tension.

All of the features disclosed in this specification (including any accompanying claims, abstract and drawings), and/or all of the steps of any method or process so disclosed, may be combined in any combination, except combinations where at least some of such features and/or steps are mutually exclusive.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

We claim:

1. A drive system comprising: a rotary part to be rotated, the rotary part comprising a drive ring; a drive belt in contact with the drive ring; a drive wheel in driving engagement, in normal operation, with the drive belt, to thereby drive the drive ring; an electric motor for driving the drive wheel; and a control means connected to the drive wheel, for automatically removing the drive wheel from driving engagement with the drive belt in any one or more of the following circumstances:

if the supply voltage fails;
   if the supply voltage falls below a minimum voltage;
   if for a reason other than the voltage failing or falling below said minimum voltage, the motor does not operate.

2. A drive system as claimed in claim 1, arranged such that, once the supply voltage is restored or returns to a voltage at or above the minimum, the drive wheel automatically resumes driving engagement with the drive belt.

3. A drive system as claimed in claim 1, wherein the belt is of the frictional type.

4. A drive system as claimed in claim 1, wherein the drive belt is taken off the drive ring and courses around a wheel whose position, inwardly to and outwardly from the drive ring, is controlled by the control means.

5. A drive system as claimed in claim 4, wherein said wheel is the drive wheel.

6. A drive system as claimed in claim 5, comprising two spaced-apart take-off wheels closely adjacent to or contacting the drive ring, which convey the drive belt to said wheel.

7. A drive system as claimed in claim 6, comprising means for adjusting the position of the take-off wheels.

8. A drive system as claimed in claim 1, wherein the control means comprises a pressurised-fluid force-providing part requiring a supply voltage for its operation.

9. A drive system as claimed in claim 1, wherein the drive wheel is mounted on a movable carriage.

10. A drive system as claimed in claim 9, wherein the carriage is pivotable.

11. A drive system as claimed in claim 10, wherein the pressurised-fluid force-providing part acts on the carriage in a sense to urge the drive wheel generally away from the axis of the drive ring, and thereby tension the drive belt.

12. A drive system as claimed in claim 11, wherein the carriage is thus urged so that the belt is tensioned to a selectable pre-determined extent.

13. A drive system as claimed in claim 8, comprising resilient means acting in a sense opposed to the pressurised-fluid force-providing part.

14. A drive system as claimed in claim 9, comprising two mechanical stop means, provided on respective sides of the carriage, to determine the two limit positions of the carriage.

15. A drive system as claimed in claim 1, further comprising a rotary arm system for a sewage treatment bed, wherein said rotary part comprises at least one rotary arm from which sewage may issue.

16. A rotary arm system for a sewage treatment bed, including a drive system which comprises: a rotary part to be rotated, the rotary part comprising a drive ring; a drive belt in contact with the drive ring; a drive wheel in driving engagement, in normal operation, with the drive belt, to thereby drive the drive ring; and electric motor for driving the drive wheel; and a control means connected to the drive wheel, for automatically removing the drive wheel from driving engagement with the drive belt in any one or more of the following circumstances:

if the supply voltage fails;
if the supply voltage falls below a minimum voltage;
if for a reason other than the voltage failing or falling below said minimum voltage, the motor does not operate.

* * * * *